United States Patent [19]

Nigawara et al.

[11] Patent Number: 5,493,729
[45] Date of Patent: Feb. 20, 1996

[54] KNOWLEDGE DATA BASE PROCESSING SYSTEM AND EXPERT SYSTEM

[75] Inventors: Seiitsu Nigawara; Shigeaki Namba; Hiroshi Kohmoto, all of Hitachi, Japan

[73] Assignee: Hitachi, Ltd., Tokyo, Japan

[21] Appl. No.: 277,366

[22] Filed: Jul. 20, 1994

Related U.S. Application Data

[63] Continuation of Ser. No. 219,464, Mar. 29, 1994, abandoned, which is a continuation of Ser. No. 669,629, Mar. 14, 1991, abandoned.

[30] Foreign Application Priority Data

Mar. 14, 1990 [JP] Japan ......................... 2-63697

[51] Int. Cl.$^6$ ..................................... G06F 15/18
[52] U.S. Cl. .................................... 395/61; 395/76
[58] Field of Search ........................ 395/51, 61, 76

[56] References Cited

U.S. PATENT DOCUMENTS

| | | | |
|---|---|---|---|
| 4,617,628 | 10/1986 | Zwicke et al. | 364/431.02 |
| 4,642,782 | 2/1987 | Kemper et al. | 364/550 |
| 4,649,515 | 3/1987 | Thompson et al. | 364/900 |
| 4,754,410 | 6/1988 | Leech et al. | 364/513 |
| 4,837,725 | 6/1989 | Yamakawa | 364/807 |
| 4,839,823 | 6/1989 | Matsumoto | 364/513 |
| 4,860,213 | 8/1989 | Bonissone | 364/513 |

FOREIGN PATENT DOCUMENTS

| | | | |
|---|---|---|---|
| 41083105 | 10/1994 | Denmark. | |
| 0246517A1 | 11/1987 | European Pat. Off. | G05B 23/02 |
| 3720195A1 | 1/1989 | Germany. | |
| 3907843A1 | 9/1989 | Germany. | |
| 3908879A1 | 11/1989 | Germany. | |
| 3918789A1 | 12/1989 | Germany. | |
| 60-8902 | 1/1985 | Japan. | |
| 60-24647 | 2/1985 | Japan. | |
| 1265311 | 10/1989 | Japan. | |

OTHER PUBLICATIONS

Dutta, S., "An Event Based Fuzzy Temporal Logic," Proc. 18th Int'l. Symp. Multiple Valued Logic, May 1988, 64–71.

Leung, et al., "Fuzzy Concepts in Expert Systems," Computer, Sep. 1988, 43–56.

Duda, et al., "Subjective Bayesian methods for rule-based inference systems," Artificial Intell., 1987, 192–199.

Gong, G., "Production Systems and Belief Functions," Computer Science and Statistics, 1986, 49–53.

Peng, et al., "A Probabilistic Causal Model of Diagnostic Problem Solving, Part I:Integrating Symbolic Causal Inference with Numeric Prob. Inference," IEEE Trans. Syst., Man and Cybernetics, 1987, 146–162.

Dixon, et al., Introduction to Statistical Analysis, McGraw-Hill, Inc., 1969, 75–91.

Pipitone, f., "the FIS Electronics Troubleshooting System," Computer, Jul. 1986, 68–76.

Morawski, P., "Understanding Bayesian Belief Networks," AI Expert, May 1989, 44–48.

Morawski, P., "Programming Bayesian Belief Networks," AI Expert, Aug. 1989, 74–79.

(List continued on next page.)

Primary Examiner—Robert W. Downs
Attorney, Agent, or Firm—Antonelli, Terry, Stout & Kraus

[57] ABSTRACT

Described is a processing system for knowledge data base in which indices representing the degrees of certainty of causal relations between an event and plural events relevant to the first-mentioned event are stored. The system has an input unit for inputting information on those actually experienced among events inferred based on the knowledge data base, an updating unit for updating the indices so that, among the plural causal relations, the certainty of the causal relation corresponding to the actually experienced event inputted by the input means is made higher relative to the certainties of the other causal relations, and a storing unit for storing back the thus-updated indices again in the knowledge data base. This allows an expert system with the processing system to perform inference with higher certainty.

15 Claims, 8 Drawing Sheets

OTHER PUBLICATIONS

J. E. Weber and P. H. Bartels, "performance Evaluation of an Expert System using Resealed Certainty Factors," 1988 Int'l. Conf. Engr. Med. & TSiO, Nov. 1988, 1371–1372.

L. Johnson and E. T. Keravnou, *Expert Systems Architectures,* Ch–2, MYCIN, Kogan Page Limited, 1988, 6–27.

S. Schocken and P. R. Kleindorfer, "Artificial Intelligence Dialects of the Bayesian Belief Revision language," IEEE Trans. on Syst., Man, and Cybernetics, vol. 19(5), Sep./Oct. 1989, 1106–1121.

K. C. Ng and B. Abramson, "Uncertainty Management in Expert Systems," IEEE Expert, Apr. 1990, 29–48.

H. Ujita et al., "Development of a Maintenance Support System for Nuclear Power Plants," J. Atomic Energy Society of Japan, vol. 29(6), Jun. 1987, 538–47.

C. Tanasescu, "New Trend in Diagnostics: Expert Systems," 6th Power Plant Dynamics, Control & Testing Symp., Apr. 1986, 64.01–64.10.

K. Yoshida et al., "An Approach to Build A Knowledge Base for Reactor Accident Diagnostic Expert System," Topical Meeting on Artificial Intelligence and Other Innovative Comp. Appl. in the Nuclear Industry:present and future, Aug. 1987, 375–381.

D. Kopcso et al., "A Comparison of the Manipulation of Expert System Shells," System Sciences, 1988 Annual Hawaii Int'l., vol. III, Jan. 1988, 181–188.

KNOWLEDGE DATA BASE PROCESSING SYSTEM AND EXPERT SYSTEM

This application is a Continuation application of Ser. No. 08/219,464, filed Mar. 29, 1994, now abandoned, which was a Continuation application of Ser. No. 07/669,629, filed Mar. 14, 1991, now abandoned.

BACKGROUND OF THE INVENTION a. Field of the Invention

This invention relates to a knowledge data base processing system having functions for updating the indices of certainty (certainty factors), which are applied to individual event propagation routes or the like, and for generating inferential information in an inference expert system adapted to perform inference of causes of events or inference of secondary effects of the events.

b. Description of the Related Art

Improvements and maintenance by a knowledge engineer are indispensable for actual updating of a knowledge data base because the preparation of a knowledge data base is based principally on human experiences and inference. Several proposals have hence been made from the viewpoints of optimization and/or automation of the updating of such a knowledge data base.

Unexamined Japanese Patent Publication (KOKAI) No. 60-24647 proposes a method for allocating intra-system resources in a system, to be shared by plural software units, in the form of application and evaluation of a knowledge base and, further, for creation of codes and selection of any recessive codes on the basis of the evaluation. In addition, according to the learning control method disclosed in Unexamined Japanese Patent Publication (KOKAI) No. 60-8902, a response obtained when an object to be controlled has been controlled by control information called beforehand from a file is evaluated and the rule is then written in the file in accordance with an index of the evaluation. The above proposals both involve the procedures whereby a response from a series of operations for an applied object is evaluated and a code or rule obtained by the evaluation is added to or deleted from a data base.

In the inference of an event, mere addition or deletion of rules based on the evaluation of an actual experience; on the object provides the knowledge data base with no sufficient ground or flexibility as long as the index of certainty (certainty factor) is fixed. It is also difficult to say that there is established a method for applying the evaluation results of actual experience to certainty factors.

As a known example of certainty factor, Unexamined Japanese Patent Publication (KOKAI) No. 1-265311 discloses a method for determining more practical certainty by providing the intensity of a process quantity, specifically the derivative with respect to time, with values of certain factors from 0 to 1. According to the method, the functional relation itself of the certainty factor can be modified depending on the cause. The cause is the intensity (the rate of a change) of the above process quantity so that automatic updating of the certainty factor is not performed based on an event actually experienced. In other words, an operator or knowledge engineer of a plant allocates the functional relation itself of certainty factor to each process quantity, which is to be controlled, manually on the basis of the past experiences. This method is therefore different in nature from the method such that, as in the present invention, the history of a real event is positively evaluated and is input to automatically update the certainty factor higher.

Further, Unexamined Japanese Patent Publication (KOKAI) No. 1-22933 discloses an inference system in which a conclusion inferred by an inference engine is judged to be correct or not by a user and the certainty factor of a rule in a knowledge base can be corrected by inputting information on the correctness or incorrectness of the conclusion. The certainty factor itself can also be corrected in this known example, but the correction is governed by the user's judgment.

As has been described above, the conventional techniques involve problems to the extent that they are insufficient in the reflection of characteristics of an object of application, objectivity as an index of certainty (certainty factor) is given based on experiences, both time and labor are required for user's judgment as cause candidate items for inferred results are provided unlimitedly, and the maintenance of certainty factors in a knowledge data base requires both judgment and labor on the side of a knowledge engineer.

SUMMARY OF THE INVENTION

It is therefore an object of the present invention to provide a knowledge data base processing system for producing a more certain inference by feeding back an actual event to the certainty factor of the event.

Another object of the present invention is to provide a knowledge data base processing system which shows cause candidate items in groups classified in the order of their certainty factors.

A further object of the present invention is to provide a knowledge data base processing system which promotes user's judgment by providing relevant historical information together with the results of inference of an event and also a function to assist a change of a knowledge data base by feeding back an actual event.

To achieve the above objects, the present invention provides, in one aspect thereof, a processing system for a knowledge data base in which indices representing the degrees of certainty of causal relations between an event and plural events relevant to the first-mentioned event are stored. The processing system comprises a means for inputting information regarding those events having actually occurred among those events inferred based on the knowledge data base; a means for updating the indices so that, among said causal relations, the certainty of a causal relation corresponding to the actually experienced event inputted by the input means is made higher relative to the certainties of the other causal relations; and a means for storing back the thus-updated indices again in the knowledge data base.

The indices representing the degrees of certainty of the causal relations can preferably be applied to at least one of the first- and second-mentioned events themselves, routes connecting the first-mentioned event with the second-mentioned events, and inference lines each of which consists of a plurality of continuous inter-event routes. Incidentally, the term "inter-event route" as used herein means a path connecting two events which belong to adjacent layers, respectively in an inference tree diagram. On the other hand, the term "inference line" means a unit of continuous inter-event routes.

The indices may be the degrees of certainty for the inference of causes/effects of the event.

The index updating means can perform updating processing each time the causes/effects are identified after the inference of the causes/effects. As an alternative, the updating processing can be performed based on statistical data of a predetermined number of actual extent occurrences.

Desirably, the processing system further comprises a means for providing a user with information based on inference results, which in turn are based on the knowledge data base and the updated indices.

In another aspect of the present invention, there is also provided a processing system for a knowledge data base in which certainty factors representing the degrees of certainty of causal relations between an event and plural events relevant to the first-mentioned event are stored. The processing system comprises a means for calculating the frequency of occurrence of a causal event (or a subsequent event) inferred with respect to a given event on the basis of the knowledge data base; and a means for updating the certainty factors of plural causal relations, which are relevant to the given event, in accordance with the degree of the frequency so calculated.

The degree of frequency of the causal event (or the subsequent event) can be used as a significant degree when the number of inference of the causal event for the given event has reached at least a pre-determined number. Preferably, the predetermined number is variably presettable.

Further, the difference between the certainty factor of the causal event (or the subsequent event) and the degree of frequency of occurrence of the causal event can be used for updating the certainty factor. For example, the updating means can perform the updating such that the difference becomes closer to 0.

It is possible to additionally provide a means for estimating a limit value of the frequency. In this case, the manner of updating itself can be modified in a direction toward :suppressing or promoting the updating of the certainty factor in accordance with the difference between the frequency and the limit value of the frequency.

In a further aspect of the present invention, there is also provided a processing system for a knowledge data base in which certainty factors representing the degrees of certainty of causal relations between an event and plural events relevant to the first-mentioned event are stored. The processing system comprises a certainty-factor updating means for increasing, in a predetermined mapping relation, the certainty factor of a causal relation corresponding to an actually experienced event among plural causal relations relevant to the actually experienced event on the basis of information relating to the actually experienced event; and a means for normalizing the certainty factors among the plural causal relations relevant to the actually experienced event.

In a still further aspect of the present invention, there is also provided a processing system for a knowledge data base in which certainty factors representing the degrees of certainty of causal relations between an event and plural events relevant to the first-mentioned event are stored. The processing system comprises a means for updating the certainty factors on the basis of an actually experienced event; a means for storing historical information on the certainty factors so updated; and a means for classifying events into at least three levels—events of higher certainty factors as semidetermined events, events of lower certainty factor as rare events and events of intermediate certainty factors as unstable events—on the basis of the historical information on the certainty factors.

Desirably, the processing system is additionally provided with a means for providing a user with the results of classification by the classifying means.

In a still further aspect of the present invention, there is also provided a processing system for a knowledge data base in which certainty factors representing the degrees of certainty of causal relations between an event and plural events relevant to the first-mentioned event are stored. The processing system comprises a means for updating the certainty factors on the basis of actually experienced events; a means for storing historical information on the certainty factors so updated; and a means for discriminating the causal relation between the historical information on the certainty factors and historical information regarding the intensities of observed physical quantities, said intensities characterizing the actually experienced, individual events. In a still further aspect of the present invention, there is also provided an expert system for producing an inference. The expert system comprises a knowledge data base in which an inference tree diagram is assumed to connect together groups of events in at least three layers extending from causal events to resultant events via intermediate events. The degrees of causal relations between the events in the adjacent layers are applied, as certainty factors, to the corresponding individual inter-event routes connecting the events in the adjacent layers. Further provided are a means for inferring events on the basis of the knowledge data base and a means for updating the knowledge data base so that the certainty factors for the inter-event routes relevant to the actually experienced events are increased.

In the above expert system, a certainty factor distribution curve representing the distribution of certainty factors for the intensities of physical quantities may be provided for each event whose certainty factor varies depending on the intensity of an observed physical quantity so that, when the certainty factor for the intensity of a given physical quantity is updated, the certainty factor distribution curve can be corrected by conducting interpolation between the thus-updated certainty factor and other certainty factors.

In a still further aspect of the present invention, there is also provided an expert system for performing inference by using a knowledge data base in which an inference tree diagram is assumed to connect together groups of events in at least three layers extending from causal events to resultant events via intermediate events and the degrees of causal relations between the events in the adjacent layers are applied, as certainty factors, to the corresponding individual inter-event routes connecting the events in the adjacent layers. Each inter-event route is defined by a combination of matrix elements by allocating the individual event items of the inference tree diagram as elements of a matrix consisting of N rows and M columns, N being the largest number among the numbers of the event items in the respective layers of the inference tree diagram and M being the number of the layers.

Preferably, a dummy row is added to the matrix consisting of the N rows and the M columns. A certainty factor of a given constant value is applied beforehand to an inter-event route which ends up with an element in the dummy row, and in inferential calculation with an event in the intermediate layer having been determined, a dummy element in the dummy row is used in place of the element of the event item in the intermediate layer. Said dummy element is in the same column as the last-mentioned element.

It is desirable that the expert system further comprise a means for recording both the times of occurrence of plural events in a common column of the assumed inference tree diagram and the events when the plural events have occurred successively before occurrence of the events in the adjacent column.

It is also possible to provide the expert system with a means for notifying an operator of the occurrence of plural events in a common column of the assumed inference tree diagram to be an abnormal state when the plural events have occurred successively before occurrence of the events in the adjacent column.

A description will hereinafter be made of how each of the above means works in the corresponding knowledge ,data base processing system of the present invention.

The means for updating an index of certainty (certainty factor) given to a tree diagram allows the processing system to perform processing by using an actual cause or secondary effect or statistical data thereof as a parameter of certainty for updating mapping such that the certainty factor for an actual cause item or an actual secondary effect item, among plural cause candidate items and secondary effect candidate items upon observation of the same event, becomes relatively larger in order to reflect characteristics of an object to which an event inference expert system is applied. This makes it possible to determine a true cause for the event or a true secondary effect of the event on the basis of more certain inference.

The means for classifying or ranking cause items of the event or secondary effect items of the event inferred with the certainty factors, which have been updated by the above certainty factor updating mapping, performs the classification or ranking by setting a multi-stage classification standard such that the items can be ranked into semi-determined causes whose certainty factors gradually approach toward approximately 1 as the actual occurrence of the event increases, rare causes whose certainty factors gradually converge at about 0 as the actual occurrence of the event increases, and unstable causes whose certainty factors fluctuate. Thus it is possible to provide a user with relatively certain and important inferred information in a form successively ranked in classes.

As information accompanying the thus-ranked individual cause effect items of the event is compiled, it is also possible to provide, as needed, the user with historical information on the certainty factor and/or diagnostic efficiency as approximate indication for the certainty of the retrieval/display and inference of similar information actually occurred in the past.

In addition, as assist information for a knowledge engineer, it is possible to achieve the automation of maintenance of each certainty factor and also to provide, as needed, past comparison and/or relation information such as information on causes/effects of past events, historical information on certainty factors and historical information on the frequency of actual experiences. This makes it possible to assist the knowledge engineer in connection with the partition/unification of event items in a tree architecture or modifications of the tree architecture based on :new relations between independent event inference lines.

Owing to the constructions described above., the present invention can exhibit inter alia the following advantageous effects.

i) Inference with higher certainty can be realized owing to the certainty factor updating processing function based on actual experiences.

ii) The conventional certainty factor maintenance by a knowledge engineer can be automated by the ,certainty factor updating processing function.

iii) Objective certainty factor maintenance is feasible by the certainty factor updating processing function.

iv) User can take necessary action quickly based on the certainty factors displayed in ranks.

v) The frequency of actual experiences can be used for a method for the evaluation of inference itself (or stable updating processing of a certainty factor can be performed by feeding back to for processing the difference between actually-experienced frequency and the certainty factor).

vi) New knowledge assist information can be provided based on information on the history of the certainty factory.

BRIEF DESCRIPTION OF THE DRAWINGS

The above and other objects, features and advantages of the present invention will become apparent from the following description and the appended claims,, taken in conjunction with the accompanying drawings in which:

DETAILED DESCRIPTION OF THE PREFERRED EMBODIMENTS

A description will hereinafter be made of a knowledge data base processing system according to one aspect of the present invention, as incorporated in an expert system which pertains to another aspect of the present invention and is adapted to perform inference of causes/effects of an event so as to diagnose any abnormality.

Figure 1:
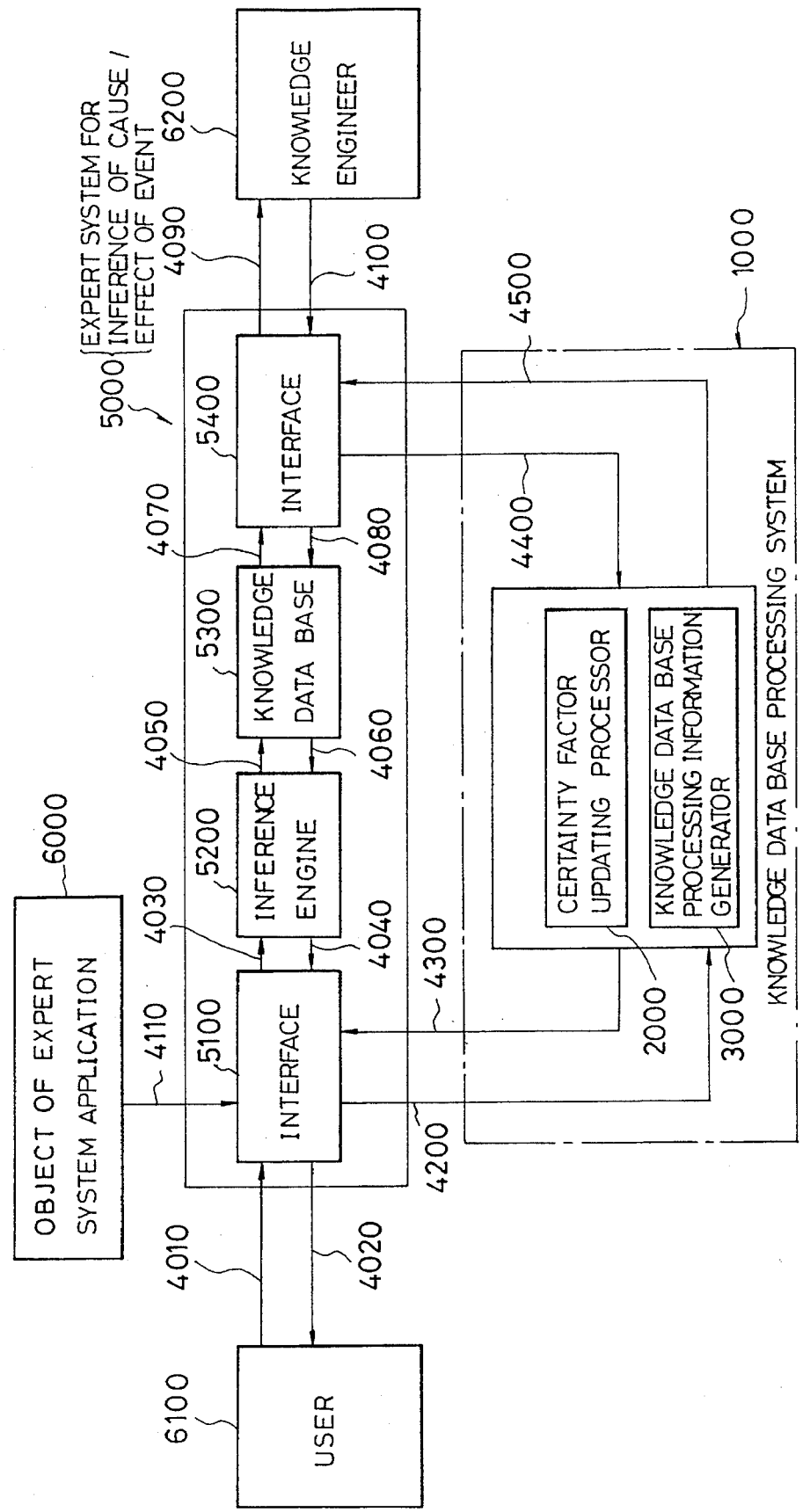
FIG. 1 is a block diagram showing the positioning of a knowledge data base processing system according to the present invention in an expert system for the inference of causes/effects of an event.

FIG. 1 illustrates the positioning of a knowledge data base processing system 1000 of the present invention in the overall system.

A conventional expert system 5000 for the inference of causes/effects of an event is constructed in the following manner. Via an interface 5100, a user 6100 gives an inference command 4010 to an inference engine 5200 through a bus 4030. The inference engine 5200 delivers a retrieval command 4050 for knowledge data, which are required for the inference, to a knowledge data base 5300, whereby desired knowledge data 4060 are read in the inference engine 5200. At the inference engine 5200, an inference operation is performed, for example, based on indices for certainty (hereinafter called "certainty factors") in a tree diagram commonly employed for the inference of causes/ effects of an event, and the results 4040 of the inference are furnished to the user 6100 through a bus 4020. In the meantime, a knowledge engineer 6200 per se investigates whether the results of the inference are good or not. If he comes to the judgment that there is a room for improvements in the knowledge data base 5300, the knowledge engineer 6200 reads out knowledge data base information 4090 via an interface 5400 and sends a knowledge data base maintenance command 4100—which instructs, on the basis of the results of his investigation, updating of the certainty factors or modification of the architecture of the tree diagram for the inference of causes/effects of the event in the knowledge data base 5300—to the knowledge data base 5300 through a bus 4080, whereby maintenance is performed.

The knowledge data base processing system 1000 of the present invention is shown within the area enclosed by alternate long and short dash lines in FIG. 1. The system is basically constructed of two main units, one being a certainty factor updating processor 2000 and the other a knowledge data base processing information generator 3000 which serves to generate historical information on the certainty factors or the like. These two units are collectively called the "knowledge data base processing system 1000". In FIG. 1, with a view toward avoiding confusion, information input to the system 1000 from the user 6100 or the inference engine 5200 and that output from the former to the latter are designated by 4200 and 4300 respectively, while information input to the system 100 from the knowledge engineer 6200 or the knowledge data base 5300 and that output from the former to the latter are indicated by 4400 and 4500, respectively.

The certainty factor updating processor 2000 makes certainty factors, which are to be used for inference, reflect each event having actually occurred on an application object of the expert system 5000, whereby certainty factors permitting more certain inferences are redefined.

As a main function, the knowledge data base processing information generator 3000 generates secondary information such as information on its own history by certainty factor updating and information of their relations, in other words, information or the like as a result of finding common trends from plural items of historical information. Further, as another main function, the generator 3000 combines the thus-generated information with inference result information output from the inference engine 5200 and data 4110 observed from the application object 6000 of the expert system 5000. The generator 300 then arranges them in a form convenient for use by the user 6100 and the knowledge engineer 6200, for example, in a diagrammatic representation with plural parameters simultaneously displayed as functions of a common axis of abscissas, and then furnishes the thus-arranged items of information to the user 6100 and the knowledge engineer 6200.

Figure 2:
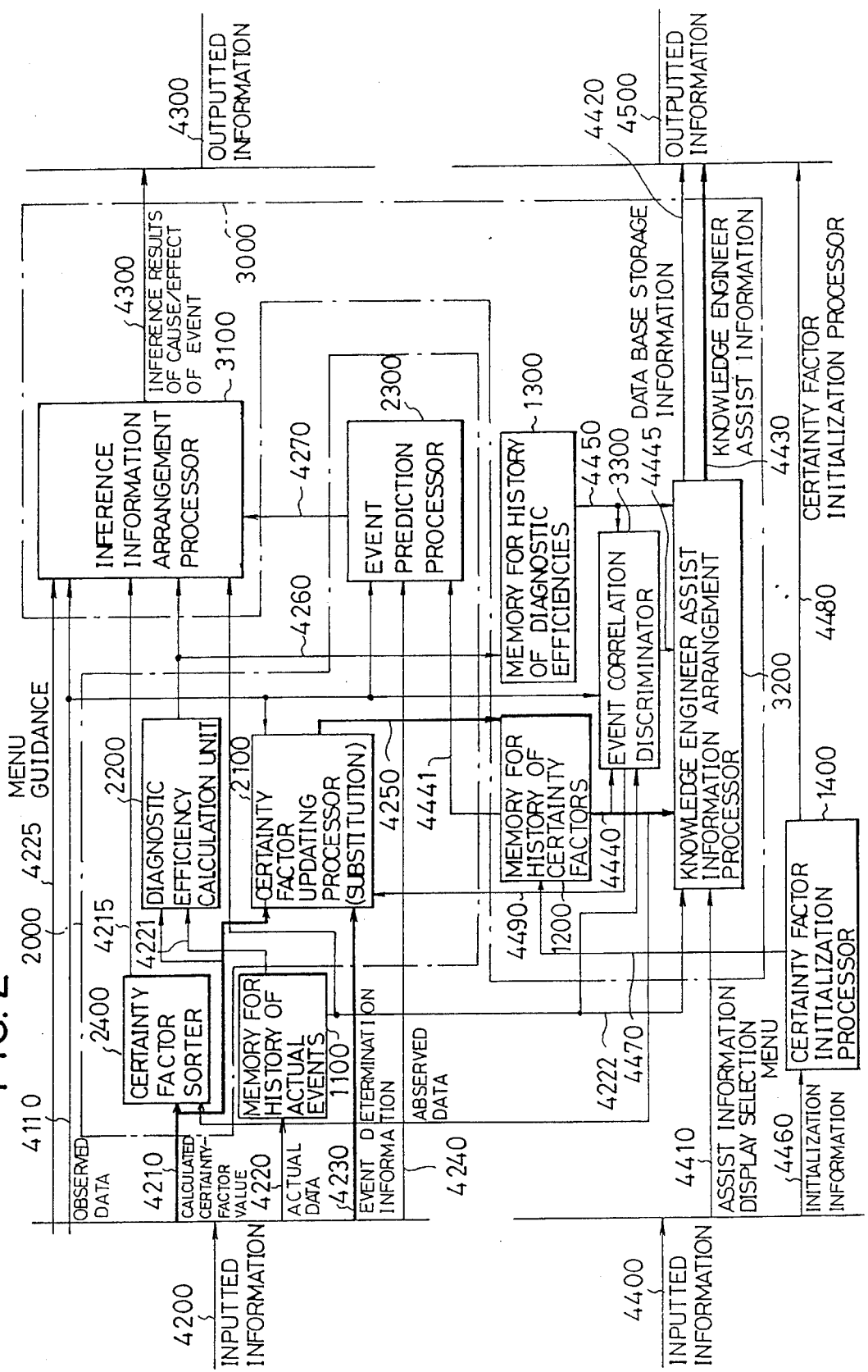
FIG. 2 is a block diagram illustrating the overall construction of the knowledge data base processing system of the present invention.

FIG. 2 is a functional diagram of the knowledge data base processing system 1000. This figure clarifies the details of the information items 4200, 4300, 4400, 4500 input or output between the interfaces 5100 and 5400 and also shows the flow of information between the individual processing units.

Details of information 4200 input to the knowledge data base processing system 1000 via the interface 5100 will next be described. The input information 4110 represents (historical) data observed on the application object of the expert system 5000, and is sent to a certainty factor updating processor 2100, an event correlation discriminator 3300, an inference information arrangement processor 3110, and the like. The certainty factor updating processor 2100 performs updating of certainty factors in accordance with the intensities of the observed data. Input information 4210 consists of identification numbers of event cause/effect items inferred at the inference engine 5200 and also calculated values of their corresponding certainty factors. Input information 4220 consists of actual data or log relating to an event, cause/effect items chosen as an object for inference or as an object for the discrimination of event correlations. Input information 4230 is event determination information from the user. Input information 4240 consists of observed data for the calculation of certainty factors of event effects, said certainty factors corresponding to certainty factors for the inference of causes of the events. The input information 4240 is delivered to an event prediction processor 2300. Input information 4225 consists of an inference result display format menu, which is used to produce at the inference information arrangement processor 3100 an inference result display format desired by the user, and a guidance for the operation of inferred causes.

Output information 4300 from the processing system 1000 to the interface 5100 are inference results of causes/effects of the event, said results having been obtained at an inference information arrangement processor 3100.

Input information 4400 to the processing system 1000 from the interface 5400 consists of an assist information display selection menu 4410 and initialization information 4460 to be used for the initialization of certainty factors. The menu 4410 is used to produce assist information, which is desired by the knowledge engineer, at a knowledge engineer assist information arrangement processor 3200.

Output information 4500 from the processing system 1000 to the interface 5400 consists of data base storage information 4420, which in turn consists of updated certainty factors and accompanying information on events having actually occurred, knowledge engineer assist information 4430 produced at the knowledge engineer assist information arrangement processor 3200, and certainty factor initialization information 4480 to be stored in the knowledge data base.

A description will next be made of the individual function units depicted in FIG. 2.

The calculated values 4210 of the certainty factors for the inference lines (including the certainty factors for the individual inter-event routes), said values having been calculated by the inference engine 5200 (see FIG. 1), are input to a certainty factor sorter 2400 and a diagnostic efficiency calculation unit 2200. The calculated values 4210 are arranged in order and then input, as ranked certainty factor information 4215, to the inference information arrangement processor 3100.

A memory 1100 for history of actual events stores actual event information 4220 derived from the knowledge data base, and outputs a determined frequency 4221 of ocurrence of each event cause/effect item especially to the diagnostic efficiency calculation unit 2200 and historical actual event information 4222, namely, the relevant certainty factors, observed data and logs at the times of inference in the past to both the inference information arrangement processor 3100 and the knowledge engineer assist information arrangement processor 3200.

The certainty factor updating processor 2100 receives certainty factor information 4210, the experienced event information 4230 input by the user, and the observed data 4110 from the application object 6000 of the expert system, performs updating on the basis of a preset certainty factor updating map, and outputs updated certainty factors 4250.

Initial values 4470 of the certainty factors and the updated certainty factors 4250 are input to and stored in a memory 1200 for history of certainty factors. They are output as historical certainty factor information 4440 as needed. It is however to be noted that no problem or inconvenience will arise even when the historical certainty factor information 4440 itself is stored in the knowledge data base 5300. In such case, such historical certainty factor information should be directly input to and output from the knowledge data base 5300 (see FIG. 1) instead of the historical certainty factor information memory 1200.

The diagnostic efficiency calculation unit 2200 receives the determined frequency 4221 of experience of each event cause/effect item and the certainty factor information 4210 and outputs, as calculation results, a diagnostic efficiency 4260 of the inference at the particular time.

The diagnostic efficiency 4260 is input to a memory 1300 for history of diagnostic efficiencies, and is output as historical diagnostic efficiency information 4450 as needed. The storage of the historical diagnostic efficiency information 4450 in the knowledge data base 5300 is performed in a similar manner to the abovedescribed storage in the historical certainty factor information memory 1200.

The event correlation discriminator 3300 receives the historical certainty factor information 4440, the historical diagnostic efficiency information 4450, and the observed data 4110 from the application object of the expert system. The discriminator 3300 then outputs correlation information 4445 relating to the results of inference such as 1) correlations between the certainty factors of the inference lines in the tree diagram, said certainty factors having been preset independently from one another in principle, 2) correlations between the observed data 4110 and the inference lines not set to have direct relations with the observed data 4110, 3) correlations between the certainty factors and the diagnostic efficiencies, and 4) common characteristics between two items of information to be compared.

The event prediction processor 2300 outputs event occurrence probability 4270 in accordance with certainty factors 4441, the observed data 4110 of the application object of the expert system and the event prediction command 4240. As will be described later, the certainty factors 4441 define, in the direction of propagation, the probability of occurrence of end events as viewed from the side of start event (cause).

The inference information arrangement processor 3100, based on the inferred information display selection menu 4225 input by the user, receives the observed data 4110 of the application object of the expert system, the ranked certainty factor information 4215, the actual event information 4221, the diagnostic efficiency 4260 and even the occurrence probability 4270 and outputs them as arranged inferred information and countermeasure guidance 4300.

Based on the assist information display selection menu 4410 input by the knowledge engineer, the knowledge engineer assist information arrangement processor 3200 suitably combines the historical actual event information 4225, the historical certainty factor information 4440, the historical diagnostic efficiency information 4450 and the event correlation information 4445 and outputs them as the knowledge engineer assist information 4430. In addition, when storing the historical certainty factor information 4440 and the historical diagnostic efficiency information 4450 in the knowledge data base 5300, the processor 3200 outputs this information (historical certainty factor and diagnostic efficiency information) 4420 to be stored in the data base.

The individual functional units and the flow of information flow in FIG. 2 have been outlined above. Prior to their detailed description, a description will hereinafter be made of an expression method for the tree diagram employed in the present embodiment and also for the inference lines contained in the tree diagram, an application method of certainty factors to the tree diagram (namely, manner of correspondence of certainty factor to the inter-unit connections in the tree diagram), the domains of the certainty factors, definition examples of the certainty factors, the domains of the certainty factor updating maps, and definition examples of the certainty factor updating maps.

Figure 3:
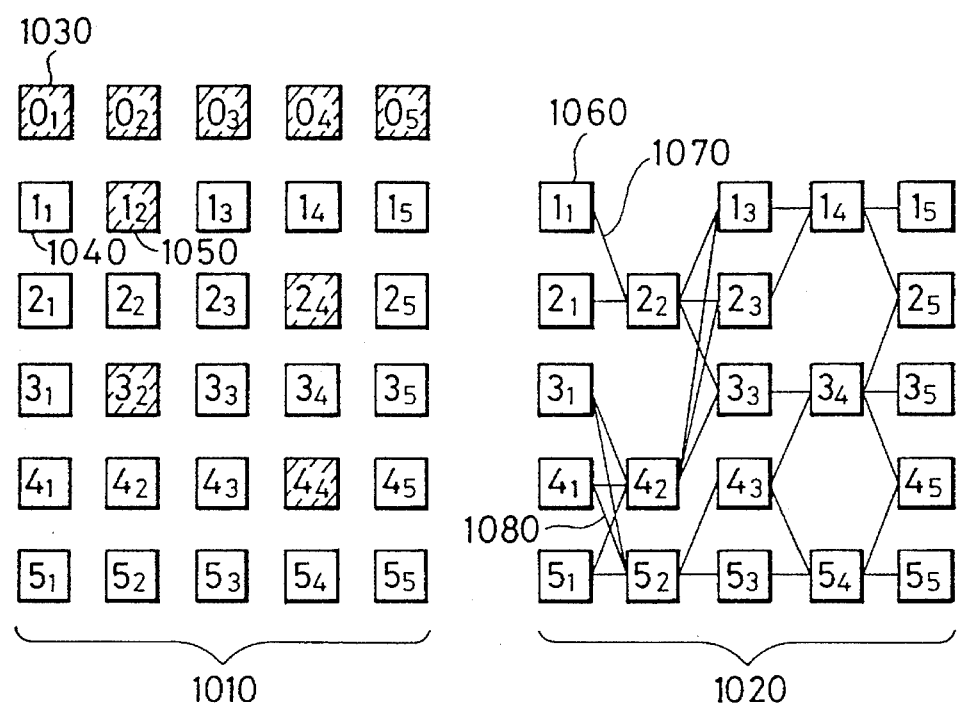
FIG. 3 is a schematic illustration of an expression method for a tree diagram.

The event items on the tree diagram 1020 can be embedded as elements of a matrix 1010 of (N+1) rows and M columns as illustrated in FIG. 3. Here, M means the greatest number of layers in the tree diagram and N represents the greatest number of items in a common layer in the tree diagram. For example, an event item in the $i^{th}$ row and the $j^{th}$ column is designated by $i_j$. Namely, this event item is expressed using the column number j as a subscript in combination with the row number i. Even when employed simultaneously with other elements, they are also expressed as $i_j$ by using i for a row and j for a column. The extra one row is designated as the $0^{th}$ row. Each element in the $0^{th}$ row has a function as a dummy element for expressing a broken inference line systematically. In the rows other than the $0^{th}$ row, extra matrix elements which do not correspond to any event items in the original tree diagram are also dummy elements.

The following formula is used as an expression for each inference line.

$$\lambda = (i_1, i_2, \ldots, i_1, \ldots, i_M) \quad (1)$$

$\lambda$ in the above formula will hereafter be used to represent each element of a set $\Lambda$ of inference lines. Incidentally, $i_1$ represents a cause item while $i_M$ denotes an end event item.

As has been described above, FIG. 3 is an schematic illustration of the expression method for the tree diagram. Designated at numeral 1010 is a matrix expression of the individual event items in the tree diagram 1020. For example, an event item 1060 in the tree diagram 1020 is arranged at 1040 in the matrix expression 1010. In the matrix expression 1010, the shaded unit items are dummy items. For example, an event item 1050 is an exemplary item having no corresponding item in the tree diagram from the beginning. The event items whose row numbers are 0 like item 1030, are used when one wants to systematically express broken inference lines. The term "broken inference line" as used herein means an inference line useful for the calculation of a certainty factor in such a case that—as opposed, for example, to an inference line completely connected from a cause of an event to an end event:

$$\lambda = (1_1, 2_2, 3_3, 3_4, 3_5) \quad (2)$$

the end event 35 has been observed and the event 33 in the third column has also happened to be determined. The broken inference line is therefore expressed as follows:

$$\lambda = (1_1, 2_2, 0_3, 3_4, 3_5) \quad (3)$$

Each certainty factor is given, for example, in such a way that it corresponds to the inter-unit route 1070 in FIG. 3, and is expressed in the following manner:

$$F(a_1, 2_2) \quad (4)$$

This means that the event item $1_1$ is inferred from the event item $2_2$ and an interpretation is also automatically applied that the above formula indicates the probability of correctness of the above inference. Accordingly, the certainty factor of the inference line λ represented by the formula (2) can be expressed by the following formula:

$$F\lambda \equiv F(1_1, 2_2) \cdot (F(2_2, 3_3) \cdot F(3_3, 3_4) \cdot F(3_4, 3_5) \quad (5)$$

If the event $1_1$ is correctly inferable from the, event $2_2$ and the event $2_1$ is correctly inferable from the event $2_2$, and they are mutually exclusive, a relation as expressed by the following formula is established:

$$F(1_1, 2_2) + F(2_1, 2_2) = 1 \quad (6)$$

Regarding the inference line λ, the following formula can be derived similarly in relation to the inference lines $\Lambda(i_1, 3_5)$ for all possible causal events starting from the event item $3_5$:

$$\sum_{\lambda \in \Lambda(i_1, 3_5)} F(\lambda) = 1 \quad (7)$$

where $\Lambda(i_1, 3_5)$ means a set of inference lines extending from the end event $3_5$ as a starting point and using it as a cause.

The domain of each certainty factor will next be described. A certainty factor is applied, for example, corresponding to the inter-event route 1070 in FIG. 3. At this time, a single value is generally given as the certainty factor, in other words, the inter-event route $(i_j, i_j)$ serves as a domain. It may also be possible to define; the certainty factor as a function of the intensity DATA $(i_j)$ of a physical quantity observed at the time of inference on the application object 6000 of the expert system 5000 or as a function of time t for the expression of deteriorations with time. In this case, it is feasible to divide a time zone into time spans and to assign different event items to the time spans respectively, thereby making it possible to have certainty factors correspond to the individual event items. This correspondence is feasible without the need for any particular modification to the tree diagram. Certainty factor updating processing requires subsequent processing when the intensities of analog process quantities including elapsed time are maintained at the same values and the processing is performed while taking the certainty factors of the corresponding events themselves into consideration.

Figure 5:
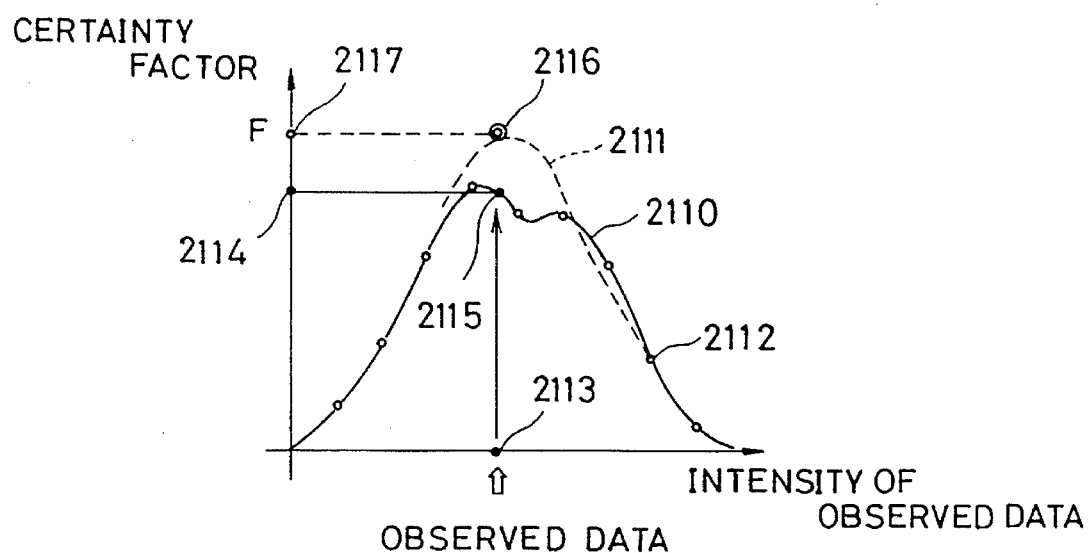
FIG. 5 is a conceptual diagram of updating processing for a certainty factor distribution curve.

FIG. 5 shows the process of updating processing of a certainty factor distribution function which is defined for the intensity of an observed physical quantity. A curve 2110 has been obtained by interpolating points (for example, point 2112), which represent certainty factors obtained by updating processing, in the light of the intensities of physical quantities observed at the time points of past inference. Now assume that an intensity 2113 has been observed as the intensity of a physical quantity. A corresponding certainty factor 2114 obtained via the curve 2110 is then employed for inference. A new certainty factor 2117 is then obtained by certainty factor updating processing. To make the certainty factor distribution curve reflect a new actual point 2116 so obtained, interpolation (the least squares method, spline interpolation or the like) is applied to a set of actual points obtained, for example, by adding the new real point 2116 to a past actual point (points in the drawing, e.g., 2112) so that a new certainty factor distribution curve 2111 is formed. This subsequent processing permits analog updating of certainty factors.

The definition of a certainty factor will next be described. By the matters mentioned above, the certainty factor corresponding to the inter-event route $(i_{j+1}, i_j)$ can be written as follows:

$$F(i_{j+1}, i_j; t, DATA(i_j)) \quad (15)$$

The formula (15) will hereinafter be referred to as $F(i_{j+1}, i_j)$ for the sake of brevity. In the formula (15), t means time and DATA$(i_j)$ represents the intensity of the physical quantity observed on the event item $i_j$. The certainty factor of the inference line k can be expressed as a function of the certainty factors of the individual inter-event routes $(i_{j+1}, i_j)$:

$$F(\lambda) = F_\lambda(F(i_{j+1}, i_j); (i_{j+1}, i_j) \subset \lambda \quad (16)$$

If the interpretation that "the probability of correct inference" is applied to the certainty factor, the certainty factor of the inference line λ can be written as follows:

$$F(\lambda) = \prod_{(i_{j+1}, i_j) \subset \lambda} F(i_{j+1}, i_j) \quad (17)$$

The following description applies only when the formula (17) is satisfied.

Figure 4:
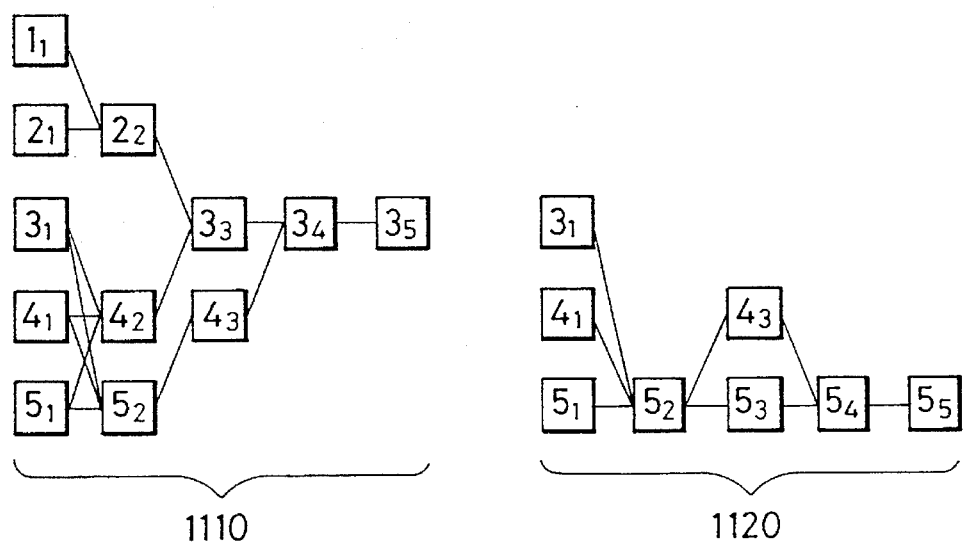
FIG. 4 is a schematic illustration of an exemplary interference among inference trees starting with different end events.

A description will next be made of the domain of each certainty factor updating map. In the inference of a cause for the end event $i_M$, the inter-event route $(i_{j+1}, i_j)$ whose certainty factor is to be calculated is contained in a tree $T(i_M)$ which extends out from the end event $i_M$. The tree $T(i_M)$ is equivalent, for example, to the tree 1110 which is shown in FIG. 4 and extends out from the end event $3_5$ as a starting point.

Namely, an event correlation diagram in the range that can be traced along intra-tree-diagram routes in either one of the directions toward the side of a cause or effect of an event when one end event item or one causal event item is designated is called a "tree". Here, the certainty factor which is subjected to certainty factor updating processing is given by the following formula:

$$F(i_{j+1}, i_j), (i_{j+1}, i_j) \subset T(i_M) \quad (18)$$

The certainty factor updating map is dependent further on an inference line λ determined after the inference, in other words, on the line λ in which an event actually occurred. Although the certainty fact or updating map may be designed to depend on the intensity DATA$(i_j)$ of a physical quantity observed on each event item $i_j$, this method is not applied to this embodiment. Accordingly, the definition range can be expressed by the following formula:

$$\{(i_{j+1}, i_j), (i_{j+1}, i_j) \subset (i_M)\} \quad (19)$$

The range of the certainty factor updating map can be described as shown below in the equation (18).

$$\{F(i_{j+1}, i_j), (i_{j+1}, i_j) \subset T(i_M)\} \quad (20)$$

In accordance with the formulae (19) and (20), the certainty factor updating map R can be expressed as follows:

$$R; \{\lambda, F_{old}(i_{j+1}, i_j), (i_{j+1}, i_j) \subset T(i_M)\} \rightarrow \{F_{new}(i_{j+1}, i_j), (i_{j+1}, i_j) \subset T(i_M)\} \quad (21)$$

Figure 6:
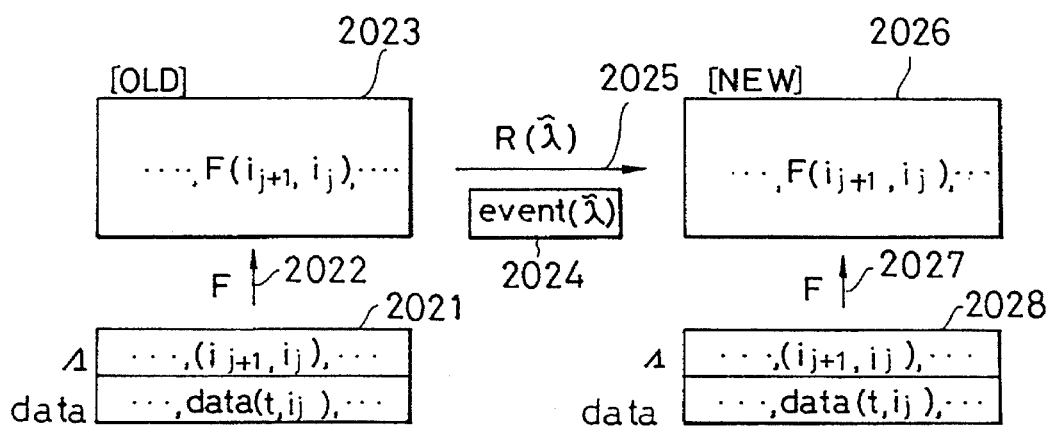
FIG. 6 is a functional diagram of updating processing for certainty factors.

FIG. 6 illustrates a functional diagram of calculation (mapping) of a certainty factor and a certainty factor updating mapping. Numeral 2021 indicates the domain of the certainty factors of interevent routes upon certain inference at time $t_{old}$. This domain is a set of the inter-event routes $(i_{j+1}, i_j)$ and data $(i_j, t_{old})$ of physical quantity observed on the event item $i_j$. Designated at numeral 2023 is a set of certainty factors $F_{old}(i_{j+1}, i_j)$ of inter-event routes, said certainty factors having been obtained by certainty factor mapping F2022. The union of 2023 and an inference line $\bar{\lambda}$2024 actually experienced and determined for inference then becomes the domain of certainty factor updating mapping R($\tilde{\lambda}$)2025. A set 2026 of new certainty factors $F_{new}(i_{j+1},i_j)$ of the inter-event routes becomes its range. In next inference at time $t_{new} > t_{old}$, updating of the certainty factor distribution curve defined based on the observed physical analog quantity is performed if necessary.. Employed for this updating are the certainty factors 2026 of the inter-event routes obtained by certainty factor mapping F2027 while using 2028 as a domain.

The above description will hereinafter be supplemented. In FIG. 6, $(i_{j+1},i_j)$ in 2021 represents a given inter-event route. If the certainty factor has a single value (i.e., the certainty degree of an event such that the feed-water level is at least a predetermined value), the data is not stored. In other words, the domain 2021 is an empty set as far as this $(i_{j+1},i_j)$ is concerned. However, when the certainty factor of the inter-event route $(i_{j+1},i_j)$ is dependent, for example, on the physical quantity observed on the event $i_j$ (for example, when the certainty factor varies depending on the intensity of vibrations), the information $(i_{j+1},i_j)$ designating the inter-event route and the physical quantity data $(t;i_j)$ at time t should be stored as elements of the domain of each inter-event route.

It is illustrated that the certainty factor $F(i_{j+1},i_j)$ is called corresponding to 2021 in the data base upon observation of the event $i_j$ (2022), the set 2023 of these certainty factors is transmitted to the operator, the finding of the inference line $\tilde{\lambda}$ as a correct inference route out of the numerous inference lines permits application of the certainty factor updating mapping 2025 to the set 2023 of the certainty factors, whereby the set 2026 of the new certainty factors to be used upon next inference is calculated.

It is to be noted that the certainty factor corresponding to the inter-event route ending up with each event item in the dummy row (1030 in FIG. 3) is 1, said certainty factor being given by the certainty factor mapping represented by the formula (18). For example, in the above-described inference line represented by the formula (3), $F(0_3,3_4)$ is 1. (Incidentally, the certainty factors for dummy event items other than those in the dummy row are 0.) This makes it possible to systematically represent each broken inference line (i.e., the inference line with not only the end event $i_M$ but also an intermediate event item being determined at the time of inference) too. Further, as an essential condition for the certainty factor updating mapping, it is mentioned that the above-mentioned dummy certainty factor remains unchanged at 1.

Figure 7:
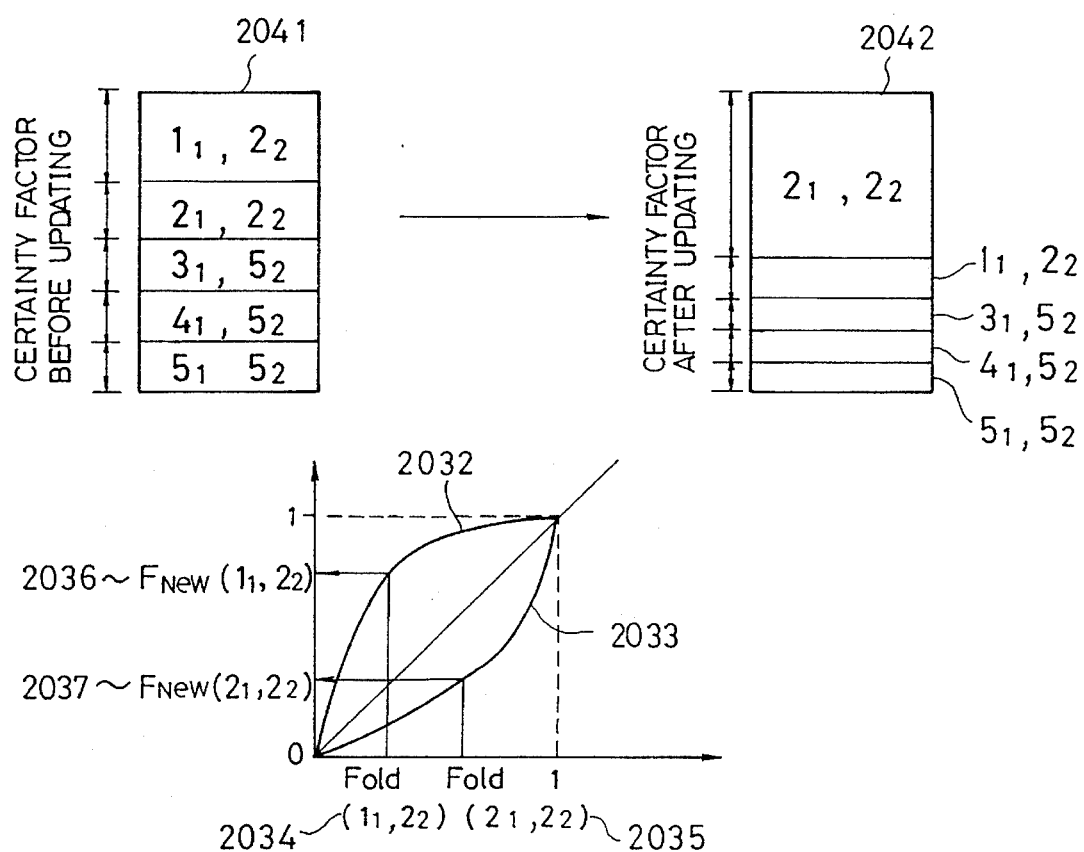
FIG. 7 is a schematic illustration of one example of updating map for certainty factors.

One example of certainty factor updating processing will next be described. FIG. 7 is a conceptual diagram showing two cases, one being such a case that the certainty factor $F(i_{j+1},i_j)$ of an inter-event route becomes relatively large as a result of frequency of occurrence of the event $i_j$, and the other such a case that the certainty factor becomes relatively small because of the infrequent occurrence of the event $i_j$. In FIG. 7, numerals 2041 and 2042 represent, taking the free diagram of FIG. 3 as an example, variations in relative ratio among the certainty factors of the individual inference lines starting from the event item $3_3$, said certainty factors being represented by the following formula:

$$F(i_1,3_3)=F(i_1,i_2)\cdot F(i_2,3_3) \quad (22)$$

The following are examples of the certain factor updating mapping:

$$F_{new}(i_{j+1},i_j)=g_1(F_{old}(i_{j+1},i_j))/\Sigma \quad (23)$$

$$F_{new}(i_{j+1},i_j)=g_2(F_{old}(i_{j+1},i_j))/\Sigma \quad (24)$$

Here, $g_1$2032 is certainty factor updating mapping for an actually-experienced inter-event route [for example, $(2_1, 2_2)$], while $g_2$2033 is certainty factor updating mapping for an inter-event route which was chosen as a cause candidate but has not been experienced as a matter of fact [for example, $(1_1,2_2)$]. The certainty factor updating mapping operations satisfy the following two conditions:

$$g_i(x): [0,1] \to [0,1], F_{old} \to F_{new} \quad (25)$$

$$i = 1,2$$

$$g_1(x) > g_2(x) \quad x \in [0,1] \quad (26)$$

where $\Sigma$ is the sum of certainty factors obtained as a result of mapping of the certainty factors of the inter-event routes, which start from the event $i_j$, by $g_i(i=1,2)$ and is a standardization factor defined by the following formula:

$$\Sigma = \sum_{i_{j+1} \neq \text{dummy}, k=1 \text{ or } 2} g_k(F_{old}((i_{j+1},i_j))) \quad (27)$$

In the example of FIG. 7, $g_1$ is the upwardly convex curve while $g_2$ is the downwardly convex curve. The certainty factor 2034 of the experienced inter-event route further increases to $F_{new}$ (2036), while the certainty factor 2035 of the inter-event route which was an inferred cause candidate but has not occurred further decreases to $F_{new}$(2037).

Figure 8:
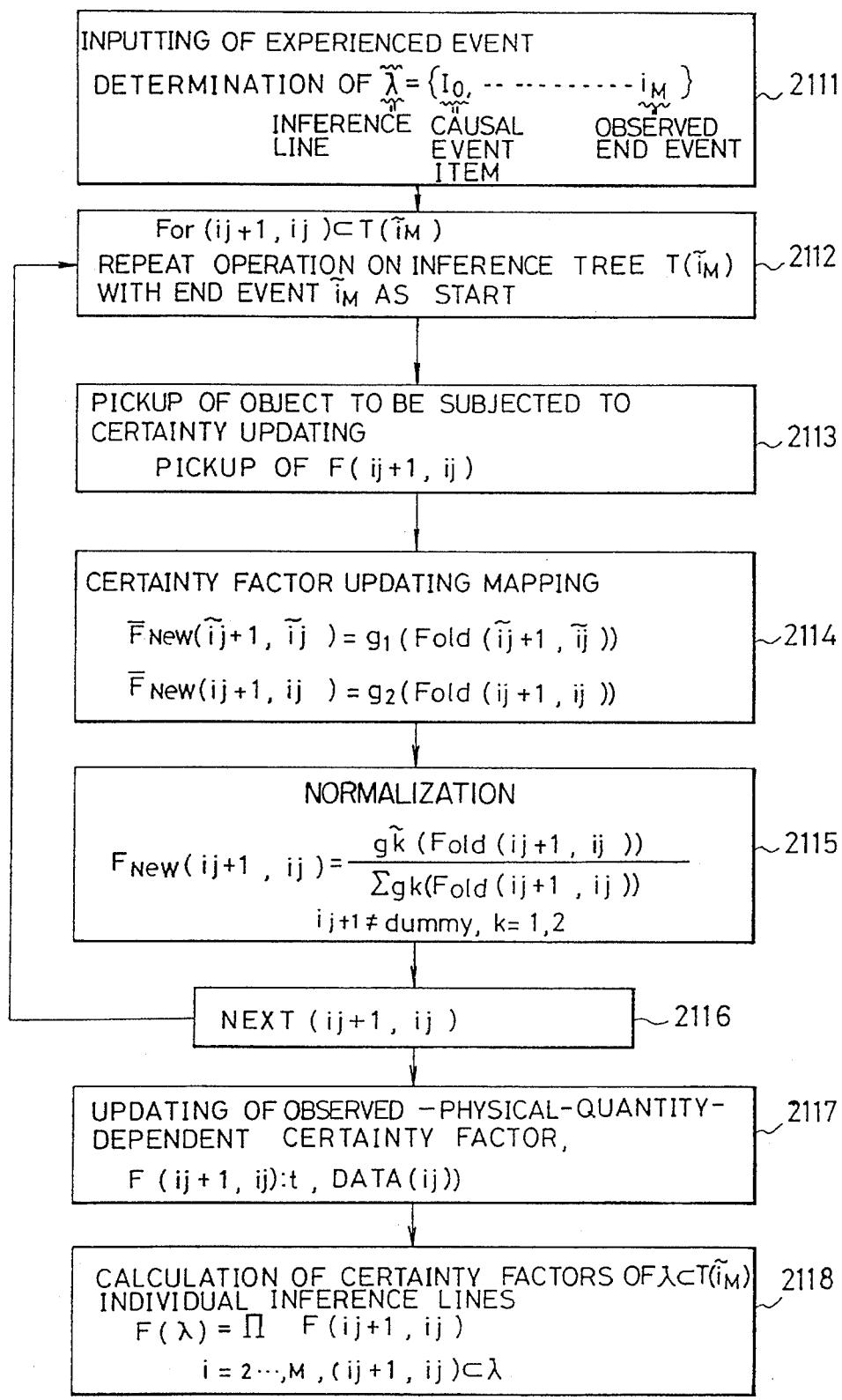
FIG. 8 is a flow diagram of updating processing of certainty factors.

The flow of the calculations in the certainty factor updating processing in the present embodiment is collectively illustrated in FIG. 8. First of all, by the processing 2111 after the observation of the end event $i_M$ and the inference of the cause thereof, input of the actually-used inference line $\tilde{\lambda}$ is effected by the user 6100. The processing 2112 is a DO loop for repeatedly conducting the processing operations of the inter-event routes contained in the inference tree $T(i_M)$, said routes starting from the end event $i_M$. In the processing 2113, read-in of the old certainty factors $F(i_{j+1},i_j)$ of the inter-event routes in the inference tree $T(i_M)$ is performed. In the processing 2114, the old certainty factors $F_{old}(i_{j+1},i_j)$ of the interevent routes are subjected to certainty factor updating mapping so that the old certainty factors are updated to unnormalized, new certainty factors $g_k(F_{old}(i_{j+1},i_j))$ of the same inter-event routes. The processing 2115 is normalization processing of $g_{\bar{k}}(F_{old}(i_{j+1},i_j))$, and the normalization factor:

$$\sum_{i_{j+1} \neq \text{dummy}, k=1 \text{ or } 2} g_k(F_{old}((i_{j+1},i_j))) \quad (28)$$

is the same as the formula (27). Here, the subscript of $\Sigma$, i.e., $$i_{j+1} \neq \text{dummy} \quad (29)$$

means that, among the inter-event routes extending out from the event item $i_j$, those extending to dummy event items are not counted. The processing 2116 is paired with the processing 2112. The processing 2117 is, as described above with reference to FIG. 5, updating processing of the certainty factors of the inter-event routes, namely, updating processing of the certainty factor distribution curve. Finally, upon next inference, the certainty factor of a desired inference line is calculated as the product of the certainty factors of its inter-event routes so that an inferred result is obtained.

Description has now been made of the tree-diagrammatic expression method, the certainty-factor application method, certainty factor domains, definition for certainty factors, domains of certainty factor updating mapping,, definition for certainty factor updating mapping, and other related matters.

The function of each unit in FIG. 2 will next be described. After the description, actual calculation examples in simple tree diagrams will be described.

Figure 9:
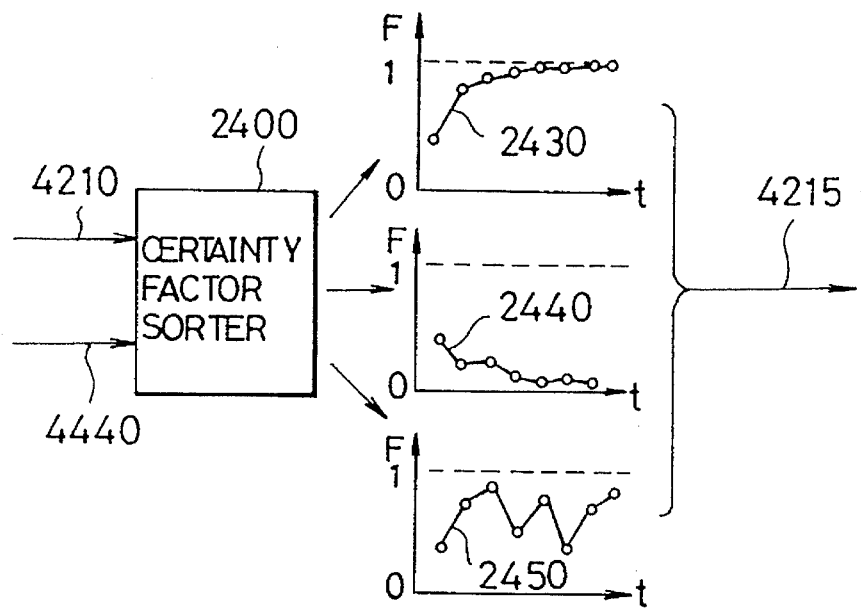
FIG. 9 is a functional diagram of a certainty factor sorter.

FIG. 9 illustrates the sorting function of the sorter 2400 for certainty factors (FIG. 2). It is the function of the certainty factor sorter 2400 to classify causal events into semi-determined causal events whose certainty factors gradually approach toward $1-\epsilon$ ($1>\epsilon>0$) through experiences, rare causal events whose certainty factors gradually approach toward $0+\epsilon$ and unstable causal events whose certainty factors oscillate from one inference to another by the historical certainty factor information 4440 output from the historical certainty factor memory 1200 and the certainty factors 4210 calculated by the inference engine 5200 in the present inference and then to output them as ranked certainty factor information 4215. FIG. 9 illustrates exemplary historical certainty factor curves for the above three cases, i.e., a historical certainty factor curve 2430 (a semi-determined causal event), a historical certainty factor curve 2440 (a rare causal event) and a historical certainty factor curve 2450 (an unstable causal event). From the basic object of the present knowledge data base processing system, it is desirable that the results of inference of causes/effects of an event be output at two ranks, i.e., as a single semi-determined causal event and as plural rare causal events. The historical certainty factor curve, however, is considered to oscillate like the historical certainty factor curve 2450 if the inference tree diagram is not set optimally to an extent such that the inference tree diagram is suited for the identification of plural causes. The rank of unstable causal events has therefore been newly set up. Further, regarding preset boundary values for the ranking, it is possible to discriminate causal events by using, as boundary values, parameters $\epsilon_-, \epsilon_+$ such that the discrimination conditions for each semi-determined causal effect are:

$$1-\epsilon_- \leq F(\lambda;t) \leq 1, \ \epsilon_- > 0 \tag{30},$$

the discrimination conditions for each rare causal event are;

$$0 \leq F(\lambda;t) \leq \epsilon_+, \ \epsilon_+ > 0 \tag{31},$$

and the discrimination conditions for each unstable causal event are:

$$\epsilon_+ \leq F(\lambda;t) \leq 1-\epsilon_- \tag{32}$$

where t means the time of the past inference.

The actual event memory 1100 is a unit which, in inference of a cause for the end event $i_M$, reads from the knowledge data base 5300 the below-described information on the objects relevant to the inference, namely, on the individual event items of the tree $T(i_M)$ in the tree diagram and stores the information therein. The above information includes historical information on whether or not the event items $i_j$ have been used for inference and each inference thus made was correct, data $DATA(i_j)$ observed in each inference., corresponding guidelines, operator logs, etc.

Upon input of the certainty factors $F(i_j)$ 4210 of the individual inter-event routes in the tree $T(i_M)$, said inter-event routes having been used in the inference of the cause for the end event $i_M$, and the actually-experienced information 4230 (i.e., the inference line actually experienced) from the user, the certainty factor updating processor 2100 performs the updating processing represented by the formulae (23)–(27).

The diagnostic efficiency calculation unit 2200 calculates the frequency of actual experiences on the basis of the historical correct information 4221 from the actual event memory 1100 and delivers the same as actually-experienced frequency 4.260 together with the certainty factors 4210 to the inference information arrangement processor 3100. The actually-experienced frequency $\eta(t_k;i_{j+1},i_j)$ of the inter-event route $(i_{j+1},i_j)$ can be defined as:

$$\eta(t_k;i_{j+1},i_j) = \sum_k \delta(t_k) / \sum_k 1 \tag{33}$$

where $$\delta(t_k) = \delta(t_k;i_{j+1},i_j) \tag{34}$$

is a function expressing whether or not the inter-event route $(i_{j+1},i_j)$ has been determined as an actual experience after the inter-event route became a candidate inference line at the time $t_k$, and satisfies the following formula:

$$\delta = \begin{matrix} 1 \ldots \text{when experienced actually} \\ 0 \ldots \text{other than the above.} \end{matrix} \tag{35}$$

The actually-experienced frequency $\eta(t_k;i_{j+1},i_j)$ should gradually approach toward the rate of right inference with which the certainty factor is basically supposed to conform at a limit, i.e., at a large number of inference operations. In this significance, the actually-experienced frequency has a function as an index for whether a presented certainty factor is appropriate or not, when a rare event happens to occur and the certainty factor varies significantly. In some instances, it is also possible to perform updating with more importance being placed on actual experiences by feeding back their difference as a damping factor to the updating mapping of the certainty factor. As a further method, it may also be contemplated to impart significance as a certainty factor to the actually-experienced frequency $\eta$ itself. This method can improve the stability of the accuracy of inference, but involves the potential problem that the followability to changes in characteristics of an applied object along the passage of time may be deteriorated as historical information increases.

The certainty factor initialization processor 1400 makes it possible to perform reliable inference more promptly, for example, by inputting latest certainty factors, which reflect the experience of actual events at certain frequencies, when the expert system has been for a similar prior plant.

The actually-experienced frequency $\eta(t_k;i_{j+1},i_j)$ cannot be reflected to the updating processing unless the number $$\sum_k 1$$

of times of selection as a candidate for causal inference exceeds a number of times, for example, 100 times) preset depending on a desired accuracy. Even if the preset value is exceeded, it is still impossible to have the updating processing reflect, for example, any seasonal abnormality (i.e., abnormality caused by air temperature, sea water temperature or humidity) because the use of $\Sigma 1$ in the above formula (33) defined for the actually-experienced frequency results in that the influence of the new actual experience to the actually-experienced frequency gradually approaches toward 0. If the characteristic time of the frequency of occurrence of abnormality can be predicted like defining the actually-experienced frequency only by actual experiences up to the $100^{th}$ experiences in the past from the latest inference, it then becomes necessary to set the value of the denominator of the formula (33) for the actually-experienced frequency constant from the characteristic time and the frequency of occurrence of the event in the past. As one example of reflection of the difference between the certainty factor F(k) and the actually-experienced frequency $$d(\lambda) = f(\lambda) - \eta(\lambda) \qquad (34)$$

to the updating processing of the certainty factors, the followings are examples of reflection of the formula (34) in the standardization of updating processing of the certainty factors of the inference line $\lambda$:

$$F_{new}(\lambda) = \frac{\eta(\lambda)}{\eta(\lambda) + \sum_{\bar\lambda \neq \lambda} F_{old}(\bar\lambda)} \qquad (35)$$

$$F_{new}(\bar\lambda \neq \lambda) = \frac{F_{old}(\bar\lambda)}{\eta(\lambda) + \sum_{\bar\lambda \neq \lambda} F_{old}(\bar\lambda)} \qquad (36)$$

By the updating processing (35),(36) on the inference line k, $d(\lambda)$ approaches toward 0 so that updating processing conforming to actual experiences can be performed. Although the certainty factor processing represented by the formulae (35) and (36) are for the inference line, they can be similarly applied to the certainty factors of the individual inter-event routes.

The event prediction processor 2300 receives the latest certain factors 4441 from the data 4110 observed on the application object and the historical certainty factor information in accordance with the event prediction command 4240 and outputs the event occurrence probability 4270 to the inference information arrangement processor 3100, whereby the inference of effects of the event can be performed. Similarly to the above-described definitions for the certainty factors represented by the formulae (4)–(7), $P(i_{j+1},i_j)$ is defined as the certainty factor of the event propagating direction on the inter-event route $(i_{j+1},i_j)$.

$$P(1_1,2_2) \qquad (38)$$

$$P(\lambda) \equiv P(1_1,2_2) \cdot P(1_2,3_3) \cdot P(3_3,3_4) \cdot P(3_4,3_5) \qquad (39)$$

$$P(1_1,2_2) + P(2_1,2_2) = 1 \qquad (40)$$

$$\sum_{\lambda \in \Lambda(1_1,3_5)} P(\lambda) = 1 \qquad (41)$$

In FIG. 3, the formula (38) is tile probability of occurrence of the event $2_2$ when the events in the second column occur subsequent to the occurrence of the event item $1_1$. The formula (39) represents the probability of occurrence of the event propagation line $\lambda=(1_1, 2_2, 3_3, 3_4, 3_5)$.

The formulae (40) and (41) represent, like the formulae (5) and (7), that the respective event propagation probabilities are exclusive event probabilities.

The certainty factors in the direction of inference of a cause of an event gives indices for the inference of the cause, while propagation certainty factors serve as indices for the prediction about at which rates events propagate from a given causal event to its respective downstream events.

With respect to this event propagation certainty factor $P(i_{j+1},i_j)$, it is also possible to perform more certain predictive inference in correspondence to the updating processing of the certainty factors of the causes of the event, which involves inference and feed-back of actual experiences, by the updating processing of the certainty factors of event propagation that involves prediction and feed-back of actual experiences.

Figure 10:
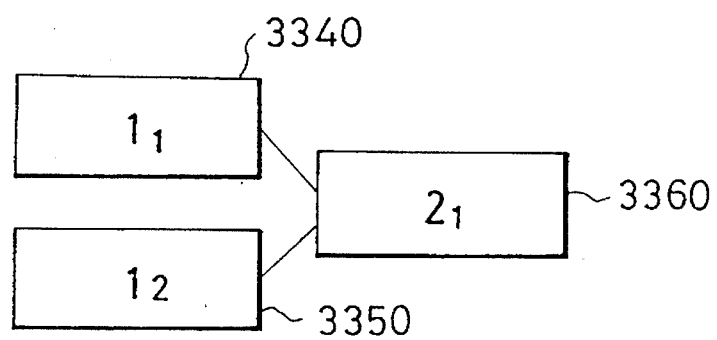
FIG. 10 is a relation diagram between historical information on a certainty factor and the intensities of physical quantities observed.
Figure 10:
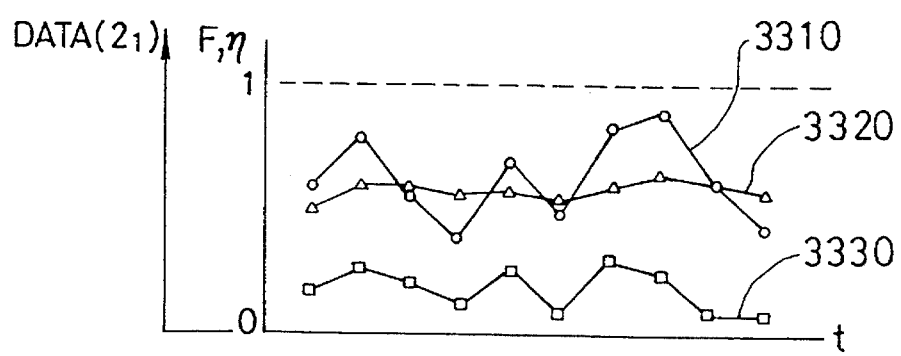

The historical certainty factor memory 1200 and the historical actually-experienced frequency memory 1300 are memories for the storage of the historical certainty factor information 4440 and the historical actually-experienced certainty factor information 4450, respectively. This information can of course be stored in the knowledge data base 5300. Whether they are stored in the knowledge data base processing system or not is determined depending on which is more advantageous taking the system construction and the processing speed into parallel consideration. Where plural causal events compete with one another upon inference of an immediately-preceding cause from a certain event $i_j$, the event correlation discriminator 3300 has the function that discrimination of such causal event is performed on the basis of the history of the physical quantity observed on the event $i_j$ upon input of the historical certainty factor information 4440, the historical actually-experienced frequency information 4450 and the historical actual experience information (the history of physical quantities observed) 4222. According to FIG. 10, where plural causes for inference compete as indicated by the polygonal line 3310 of the certainty factor history $F(t_k;1_i,2_2)_{i=1,2}$ and the polygonal line 3320 of the actually-experienced frequency history $\eta(t_k;1_i,2_2)$, the certainty factor history $F(t_k;1_i,2_2)$ 3310 and the observed physical quantity history $DATA(t_k;2_1)$ appear to have some correlation provided that the physical quantity history $DATA(t_k;2_1)$ observed on the event $2_1$ is like the polygonal line 3330. To specifically evaluate the correlation, the actually-experienced frequency and the certainty factor F are deemed as certain average values and the sum of the products of their differences and the difference between the average values $\overline{DATA(2_1)}$ and $DATA(t_k;2_1)$. Namely, $$\Delta = \sum_{t_k} [F(t_k;1_1,2_1) - \eta(t_k;1_1,2_2)] \times [DATA(t_k;2_1) - (\overline{DATA(2_1)})] \qquad (42)$$

If the correlation $\Delta$ is positive here, information is obtained such that the chance of the cause being $1_1$ is high when the intensity of the observed physical quantity is high but is low when the intensity is small. If $\Delta$ is 0, the individual variations are at random. This can be interpreted as non-existence of correlations. If $\Delta \neq 0$, it is possible to provide the knowledge engineer with information such that a more advantageous inference may be feasible when the event item $2_1$ in the tree diagram is divided into two depending on the magnitude of the observed quantity.

Figure 11:
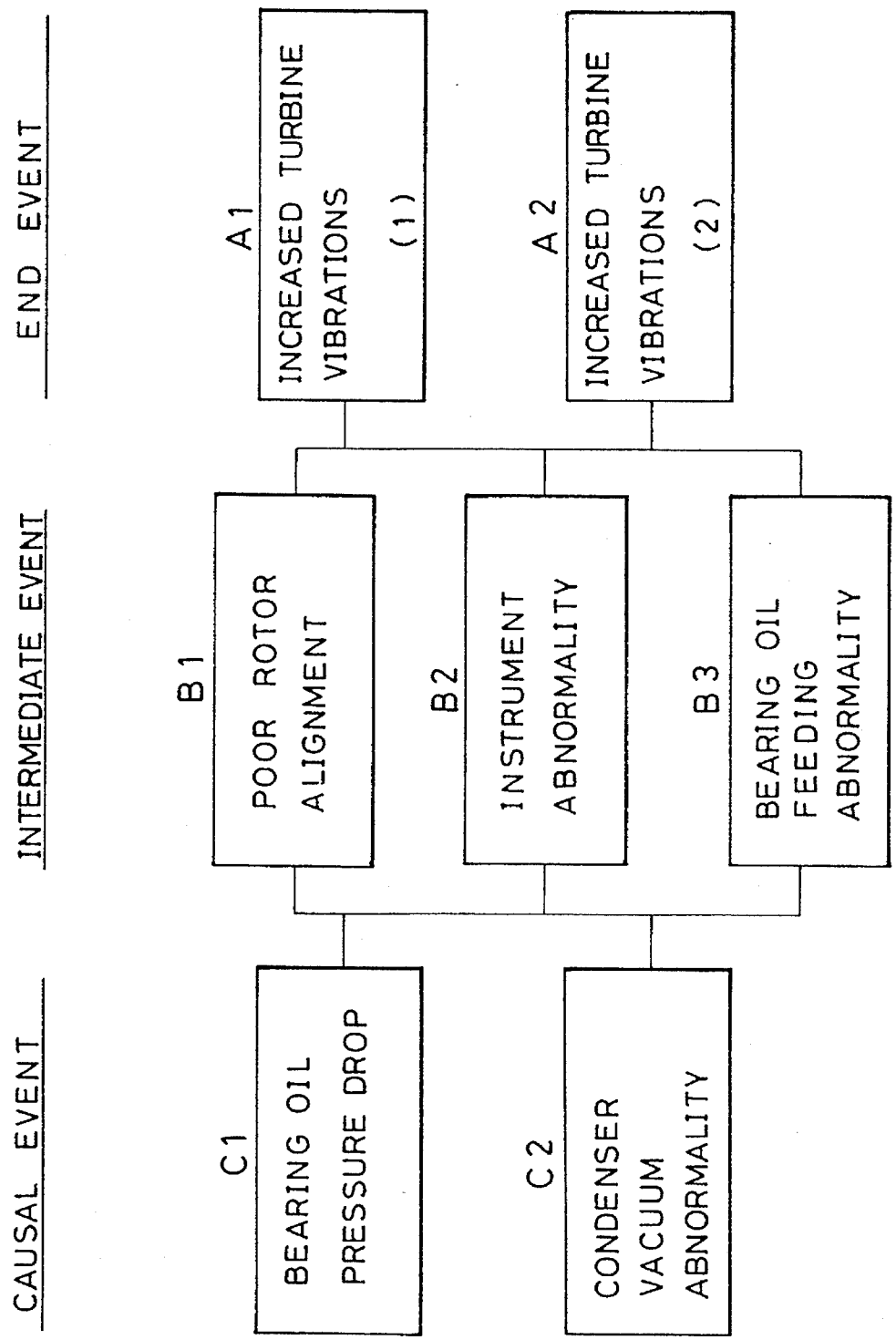
FIG. 11 illustrates an exemplary application of the present invention to a thermal electric power plant.

With reference to FIG. 11, a description will next be made of an exemplary application of the present invention for the inference of a cause item of an event as a cause for the abnormal state that a turbine shaft vibrates substantially in a thermal electric power plant.

When low bearing oil pressure drop (event C1) and a condenser vacuum abnormality (event C2) are proposed as casual candidates when a turbine vibration increase (event A1) occurs as an end event, the certainty factor F is defined, as will be described below in order to infer either one of the cause events C1 and C2 with higher certainty. Incidentally, this applies equally to the turbine vibration increase (event A2). Assume that intermediate events on the way going back to a causal event from an end event are the events B1–B3 in the drawing. Applying probabilities as certainty factors, the following calculation is effected:

$$\begin{aligned}
F(A1 \to C1) &= F(A1 \to B1 \to C1) + \\
&\quad F(A1 \to B2 \to C1) + \\
&\quad F(A1 \to B3 \to C1) = \\
&\quad P(A1 \to B1) \cdot P(B1 \to C1) + \\
&\quad P(A1 \to B2) \cdot P(B2 \to C1) + \\
&\quad P(A1 \to B3) \cdot P(B3 \to C1)
\end{aligned}$$

where $P(A1 \to B1)$ means the probability of occurrence of the event B1 when the event A1 has been ascertained.

Similarly, $$F(A1 \rightarrow C2) = F(A1 \rightarrow B1 \rightarrow C2) + $$
$$F(A1 \rightarrow B2 \rightarrow C2) + $$
$$F(A1 \rightarrow B3 \rightarrow C2) = $$
$$P(A1 \rightarrow B1) \cdot P(B1 \rightarrow C2) + $$
$$P(A1 \rightarrow B2) \cdot P(B2 \rightarrow C2) + $$
$$P(A1 \rightarrow B3) \cdot P(B3 \rightarrow C2)$$

Now assume that the values of Table 1 are given as values of the respective probabilities. These values are the data of initial values of the certainty factors or data of the certainty factors at a certain point after starting the use of the present invention, in other words, data before certainty factor updating processing based on an event newly experienced and those after the certainty factor updating processing. In this example, $F_{(NEW)}=F_{(OLD)}^{1/2}$ and $F_{(NEW)}=F_{(OLD)}$ will be used as certainty-factor updating functions. $F_{(OLD)}$—is set to the path between events actually experienced so that the certainty for the path becomes higher based on the actual experiences. On the other hand, $F_{(OLD)}$ is set to each path not experienced actually so that the certainty factors for paths not experienced actually conform with one another. Since the probability calculation is applied, the values obtained for the individual paths by the above functions are normalized in advance such that the sum of the probabilities of all exclusive events becomes 1.

The calculation of the probabilities before the updating, said calculating making use of the values of Table 1, is written as follows:

$$F(A1 \rightarrow C1) = 0.6 \times 0.3 + 0.2 \times 0.1 + 0.2 \times 0.5$$
$$= 0.18 + 0.02 + 0.1$$
$$= 0.3$$
$$F(A1 \rightarrow C2) = 0.6 \times 0.7 + 0.2 \times 0.9 + 0.2 \times 0.5$$
$$= 0.42 + 0.18 + 0.1$$
$$= 0.7 (= 1 - F(A1 \rightarrow C1))$$

On the other hand, the calculation of the probabilities after the updating can be effected in the following manner. Assuming that A1→B1→C1 is a line actually experienced, the following formulae are derived in view of $F_{(NEW)}=F_{(OLD)}^{1/2}$:

$$0.6^{1/2}=0.775 \; (F(A1 \rightarrow B1))^{1/2}) \quad <1>$$

$$0.3^{1/2}=0.548 \; (F(B1 \rightarrow C1))^{1/2}) \quad <2<$$

From $F_{(NEW)}=F_{(OLD)}$, $$0.2=0.2 \; (F(A1 \rightarrow B2)) \quad <3>$$

$$0.2=0.2 \; (F(A1 \rightarrow B3)) \quad <4>$$

$$0.1=0.1 \; (F(B2 \rightarrow C1)) \quad <5>$$

$$0.5=0.5 \; (F(B3 \rightarrow C1)) \quad <6>$$

Next, as calculation for normalized, the following formulae are derived from the formulae <1>, <2> and <3>:

$$F_{(NEW)}(A1 \rightarrow B1) = 0.775/(0.775 + 0.2 + 0.2) \quad <7>$$
$$= 0.660$$

$$F_{(NEW)}(A1 \rightarrow B2) = 0.2/(0.775 + 0.2 + 0.2) \quad <8>$$
$$= 0.170$$

$$F_{(NEW)}(A1 \rightarrow B3) = 0.2/(0.775 + 0.2 + 0.2) \quad <9>$$
$$= 0.170$$

From the formulae <2>, <5> and <6>, $$F_{(NEW)}(B1 \rightarrow C1) = 0.548/(0.548 + 0.1 + 0.5) \quad <10>$$
$$= 0.477$$

$$F_{(NEW)}(B2 \rightarrow C1) = 0.1/(0.548 + 0.1 + 0.5) \quad <11>$$
$$= 0.087$$

$$F_{(NEW)}(B3 \rightarrow C1) = 0.5/(0.548 + 0.1 + 0.5) \quad <12>$$
$$= 0.436$$

The results of formulae <7>–<12> are shown as updated certainty factors in Table 1. It is to be noted from the above calculation results that the certainty factors from the intermediate events to the causal event C2 are also corrected by probability-related calculation concurrently with the change and correction of the certainty factors from the intermediate events B1, B2 and B3 to the causal event C1.

From the above results, the certainty of the event C1 as a cause inferred in the tree diagram at the time of occurrence of the end event A1 can be determined by the following calculation:

$$F_{(NEW)}(A1 \rightarrow C1) = 0.660 \times 0.477 + 0.170 \times 0.087 +$$
$$0.170 \times 0.436 =$$
$$0.295 + 0.015 + 0.074 =$$
$$0.404$$
$$F_{(NEW)}(A1 \rightarrow C2) = 0.660 \times 0.523 + 0.170 \times 0.913 +$$
$$0.170 \times 0.564 =$$
$$0.345 + 0.155 + 0.096 =$$
$$0.596$$
$$(= 1 - F_{(NEW)}(A1 \rightarrow C1))$$

Namely, it is meant that the certainty factor has been increased from 0.3 to 0.404.

TABLE 1

|  | Certainty factor F before updating | Certainty factor F after updating |
|---|---|---|
| F(A1→B1) | 0.6 | 0.660 |
| F(A1→B2) | 0.2 | 0.170 |
| F(A1→B3) | 0.2 | 0.170 |
| F(B1→C1) | 0.3 | 0.477 |
| F(B2→C1) | 0.1 | 0.087 |
| F(B3→C1) | 0.5 | 0.436 |
| F(B1→C2) | 0.7 | 0.523 |
| F(B2→C2) | 0.9 | 0.913 |
| F(B3→C2) | 0.5 | 0.564 |

A description will next be made of a map setting method for a new certainty factor $F_{NEW}$ in updating a certainty factor. As has been described above, by positively evaluating each event having actually occurred and setting the certainty factor, which is to be used in inference with higher certainty of a cause/effect of a similar event upon its occurrence in the future, higher than a conventional value (the previous value), the worth of the certainty factors as operation knowledge information specific to a plant as an object of application can be increased. For some objects, it is desirable to apply characteristic weighting to such updated certainty factors. Assume, by way of example, that occurrence of an abnormal state due to a malfunction caused by an operator is possible somewhere in intermediate events or causal events in such a tree diagram as illustrated in FIG. 11 and the probability of such a malfunction is 5%. Assume further the malfunction by the operator results in such inconvenience that an apparatus which is supposed to operate does not operate or a valve which is supposed to be closed completely is not closed completely. Also assume that, as a result, a desired process quantity cannot be obtained or leakage takes place through the valve and that this is learned for the first time by the operator based on a detection signal from an abnormal state detector and is experienced as an actual event. Now assume that, if the certainty factor (or the probability) of the malfunction by the operator is 0.1 upon inference of a cause for the abnormality from the detection of the abnormality, updating is performed to raise the certainty factor to 0.2 upon observation of the malfunction. The operator however normally tries to lower the probability of the malfunction based on effects of his self-learning from the previous malfunction, and evaluates that the value would drop from 5% to 2%. Consequently, taking detection of abnormality as a prerequisite, it is considered correct to decrease the certainty factor upon inference of a causal event for the abnormality because the probability of the malfunction by the operator himself is as low as 0.4 times ,even if the certainty factor of the malfunction by the operator is doubled. As a result, the overall accuracy of the inference is lowered. As is appreciated from the foregoing, the present system is accompanied by the potential problem that an error may occur upon making a decision as to whether the certainty factor for the inference be increased or decreased if the characteristics and/or ability of an applied object or person per se are modified based on inconvenient actual events. Accordingly, when the above-described malfunction by the operator is taken into consideration, certainty factors should be set by applying weighting while taking into consideration not only the probability of the malfunction but also the biotechnological operation trend upon actualization of consciousness, such as the probability of the malfunction after the malfunction has taken place once.

One example in which a numerically-represented certainty factor is not fully complete has been described first in the above. Conversely speaking, this implies that an aspect, which is always supposed to be true as mapping for a certainty factor, cannot be dealt with by a formula or a specific value. In other words, as long as an event actually occurred on a plant as an .application object is recognized by the data base processing system of the present invention installed in the plant, an updated certainty factor is set under the prerequisite that the updating of the certainty factor is effected from the standpoint of positively recognizing the possibility of re-occurrence of the event, namely, from the standpoint that, with respect to an event actually experienced, a new certainty factor is not smaller than the previous certainty factor.

A description will next be made of the significance of weighting in updating processing of a certainty factor. A certainty factor is generally set at a value in the range of from 0 to 1. The certainty factor of 1 indicates the case that, in a tree diagram, an event correlation is fixed by a single line. Where there are lines extending to plural events, it is the general practice to set each of the certainty factors of these lines at a value smaller than 1 and to set their sum at 1. Now assume that a certain event has occurred N times successively. As far as its certainty factor falls within a range sufficiently smaller than 1, the new certainty factor takes a predetermined value in accordance with a predetermined function although the value varies depending of the state of the plant. In general however, the certainty factor is set at a value substantially equal to the original certainty factor in the neighborhood of 1, namely, when the event has occurred close to N times. This is a countermeasure to prevent the certainty factor from rapidly approaching 1. However, there is the possibility of setting a certainty-factor updating function similar to a step function depending on the phenomenon. The above-mentioned certainty-factor setting method is therefore not common to all the cases.

Regarding the weighting of the updating processing for a certainty factor, weighting may be determined by limitations imposed from the standpoint of operation of a plant. Assume by way of example that, when axial vibrations of a rotor in operation have increased and have been recognized as an actually-occurred event although the vibrations have not reached a preset warning threshold, a mis-alignment at the time of the previous periodic inspection has been evidently found to be a causal event for the event from records or the like. Also assume that correction of this alignment is conducted only at the time of each periodic inspection and the operation will be continued in the present state until that time. In general, there are many potential causes for vibrations. They include many causes which can be eliminated by correction or repair of individual control systems like the feeding oil pressure for a bearing. However, there is no control over a mis-alignment. In such a case, it is necessary to exert one's ingenuity in the updating of a certainty factor upon inference of a causal event. It is desirable to set mapping in such a way that the certainty factor be rapidly brought to 1. As has been described above, it is necessary to make the updated certainty factor approach 1 when an operation trend or the like specific to the plant is concerned.

A description will next be made of a method for correcting the updated mapping itself for a certainty factor. Under the conditions that the occurrence of an event has taken place more than a predetermined number of times, for example, when the event has actually taken place more than 100 times, the operator displays the history of the particular event item and at the same time calculates the frequency of the item in the 100 times of its occurrence in order to improve the accuracy of inference based on the certainty factor. When the history of a particular event item out of the events actually occurred shows a tendency of moving toward a certain limit value, the limit value is estimated. As significance which the limit value has, it may be interpreted as a value at convergence when the limit value converges at a certain constant value. When there is a tendency of oscillations at a pitch of times, the average of the maximum value and the minimum value or the like may be considered as a limit value. The limit value determined in the manner described above is compared with the frequency described above. For the reasons that the frequency is based on actual experiences, greater importance is placed on the fact that bringing the frequency and the limit value .closer to each other leads to high accuracy. The updating mapping of the certainty factor is hence modified such that the certainty factor becomes closer to the frequency. Namely, modifications are effected to the updating map itself such that the gain preset as updating mapping for the certainty factor becomes greater when the frequency is greater than the limit value and no event has occurred and smaller when the event has occurred. In the opposite case, modification are similarly effected to the updating map itself such that the gain is made smaller when the frequency is smaller than the limit value and no event has occurred and is made greater than the event has occurred. As a method for the determination of the gain, an operation is performed to reflect a factor, which is proportional to the difference between the frequency and the limit value, as a bias quantity to the updated certainty factor, thereby making it possible to conduct inference with higher certainty. Described specifically, when the certainty factor in the nth time is Fn and the limit value of the certainty factor is Flim, the gain of the updating mapping is changed using K(Flim–Fn), K being a positive constant,, as a bias quantity. Incidentally, the "gain of the updated mapping" is equivalent to the degree of bending of each curve in the diagram of FIG. 7.

From the standpoint as a user of the present system, a description will next be made of the possibility of occurrence of inconvenience upon use of the system and a countermeasure for the inconvenience. Assume that two events which were supposed be make up a cause-effect relationship were arranged in the same column due to a setting error upon setting the tree diagram of FIG. 3. Also assume that the event $3_3$ occurred at a certain time point T and the event $4_3$ took place subsequently. If neither the event $2_2$ nor the event $4_2$ has occurred yet at that time, there is the possibility that the event $3_3$ could have been a cause for the event $4_3$. Although this does not necessarily prove that $T_3$ is a causal event for $T_4$, this suggests its possibility and should be considered as a sort of abnormal state. In such a case, it should be displayed on a CRT or it should be warned by an alarm, and at the same time, the causality should be confirmed specifically. Further, the difference in timing between these two events is an essential requirement at the time of confirmation of causality to be conducted subsequently. It is hence desirable to add the time of the occurrence and then to automatically record the same automatically.

Although the present invention has been described taking the electric power plant as an example, the present invention can be applied for the diagnosis of abnormality in chemical plants, production plants, large-scale transportation systems, large-scale precision apparatus, etc. Not necessarily limited to the diagnosis of abnormality, the present invention can be applied to control, repair, education and the like, which generally requires prediction of events, and to their assistance.

What is claimed is:

1. A processing system for processing knowledge data of a knowledge data base for an electric power plant included in an inference system in which indices representing degrees of certainty of causal relations between a given event occurring at a device of said electric power plant and plural events relevant to said given event are stored, said processing system comprising:

means for receiving information regarding which of said plural events has actually occurred with respect to said given event, said plural events being inferred by said inference system based on said knowledge data base by using said indices;

means for updating said indices by increasing in a predetermined mapping relation, among said causal relations, a certainty of a causal relation corresponding to said one of said plural events having actually occurred with respect to said given event relative to certainties of said causal relations of said other plural events; and means for storing back said updated indices again in said knowledge data base, said indices being degrees of certainty for inferences of causes/effects of said plural events with respect to said given event.

2. The processing system of claim 1, wherein said updating means performs updating processing each time said causes/effects are identified after inference of said causes/effects.

3. The processing system of claim 1, wherein said updating means performs updating processing based on statistical data of a predetermined number of actual occurrences.

4. The processing system of claim 1, further comprising means for providing a user with information regarding results of inferences based on said knowledge data base and said updated indices.

5. A processing system for processing knowledge data of a knowledge data base included in an inference system in which certainty factors representing degrees of certainty of causal relations between a given event and plural events relevant to the said given event are stored, said processing system comprising:

means for calculating a degree of frequency of actual occurrences of a causal event (or a subsequent event) inferred by said inference system with respect to said given event based on said knowledge data base by using said certainty factors; and means for updating said certainty factors of plural causal relations, which are relevant to said given event, in accordance with said degree of frequency of actual occurrences of said causal event (or subsequent event), so calculated, the thus updated certainty factors being stored back to said knowledge data base.

6. A processing system for processing knowledge data of a knowledge data base included in an inference system in which certainty factors representing degrees of certainty of causal relations between a given event and plural events relevant to said given event are stored, said processing system comprising:

means for calculating a degree of frequency of actual occurrences of a causal event (or a subsequent event) inferred by said inference system with respect to said given event based on said knowledge data base by using said certainty factors; and means for updating Said certainty factors of plural causal relations, which are relevant to said given event, in accordance with said degree of frequency of actual occurrences of said causal event (or the subsequent event), so calculated, the thus updated certainty factors being stored back to said knowledge data base, wherein said degree of frequency of actual occurrences of said causal event is used as a significant degree when an incrementing number of inferences of said causal event (or the subsequent event) for said given event has reached at least a predetermined number, said predetermined number being variably presentable, and wherein the difference between said certainty factor of said causal event (or the subsequent event) and said degree of frequency of actual occurrences of said causal event (or the subsequent event) is used for updating said certainty factor.

7. The processing system of claim 6, wherein said updating means performs said updating such that said difference becomes closer to 0.

8. The processing system of claim 6, further comprising means for estimating a limit value of said frequency of actual causal event occurrence.

9. The processing system of claim 8, wherein said updating, itself, is modified for either suppressing or promoting updating of said certainty factor in accordance with said difference between said frequency and said limit value of said frequency.

10. A processing system for processing knowledge data of a knowledge data base for an electric power plant included in an inference system in which certainty factors representing degrees of certainty of causal relations between a given event occurring at a device of the electric power plant and plural events occurring at other devices of the electric power plant relevant to said given event are stored, each of said certainty factors being a number between zero and one, said inference system inferring a cause/effect with respect to said given event based upon said knowledge data base by using said certainty factors, said processing system comprising:

certainty-factor updating means for, based upon information regarding which one of said plural events has actually occurred, increasing, in a predetermined mapping relation, a certainty factor of one of plural causal relations between said given event and said one of said plural events, said one of said plural events having actually occurred, the thus updated certainty factors being stored back to said knowledge data base; and means for normalizing said certainty factors of said plural causal relations between said given event and said plural events such that a sum of said certainty factors is equal to one.

11. A processing system for processing knowledge data of a knowledge data base for an electric power plant included in an inference system in which certainty factors representing degrees of certainty of causal relations between a given event occurring at a device of the electric power plant and plural events occurring at other devices of the electric power plant relevant to said given event are stored, said processing system comprising:

means for updating said certainty factors based upon information regarding which one of said plural events has actually occurred with respect to said given event by increasing a certainty factor of a causal relation between said given event and said one of said plural events relative to certainty factors of causal relations between said given event and others of said plural events, the thus updated certainty factors being stored back to said knowledge data base;

means for storing historical information of said updated certainty factors from said knowledge data base in said inference system;

means for classifying events into at least three levels such that events of higher certainty factors are classified as semideterrnined events, events of lower certainty factor are classified as rare events and events of intermediate certainty factors are classified as unstable events based upon said historical information of said Updated certainty factors from said knowledge data base said inference system; and means for providing a user with results of said classification performed by said classifying means.

12. A processing system for processing knowledge data of a knowledge data base for an electric power plant included in an inference system in which certainty factors representing degrees of certainty of causal relations between a given event occurring at a device of the electric power plant and plural events occurring at other devices of the electric power plant relevant to said given event are stored, said processing system comprising:

means for updating said certainty factors based upon events having actually occurred at a device of the electric power plant, the thus updated certainty factors being stored back to said knowledge data base;

means for storing historical information of said updated certainty factors from said knowledge data base in said inference system; and means for discriminating a causal relation between said historical information of said updated certainty factors and historical information regarding intensities of observed physical quantities, said intensities defining individual events having actually occurred.

13. An expert system for rendering an inference, comprising:

a knowledge data base in which an inference tree diagram connects together groups of events in at least three layers extending from causal events to resultant events via intermediate events, wherein degrees of causal relations between said events in said adjacent layers are applied., as certainty factors, to corresponding individual inter-event routes connecting events in said adjacent layers;

means for inferring events based upon said knowledge data base; and updating means for updating said knowledge data base so that said certainty factors for said inter-event routes relevant to actually occurred events are increased, wherein said updating means includes a certainty factor distribution curve representing distribution of certainty factors for intensities of physical quantities, said certainty factor distribution curve being provided for each event whose certainty factor varies depending on the intensity of an observed physical quantity, wherein when the certainty factor for the intensity of a given physical quantity is updated, the certainty factor distribution curve is corrected by said updating means by conducting interpolation between the thus-updated certainty factor and other certainty factors, wherein each inter-event route is defined by a combination of matrix elements by allocating said individual event items of the inference tree diagram as elements of a matrix consisting of N rows and M columns, N being the largest number among the numbers of the event items in the respective layers of said inference tree diagram and M being the number of said layers, and wherein a dummy row is added by said updating means to said matrix consisting of the N rows and the M columns, a certainty factor of a given constant value is applied beforehand to an inter-event route which ends up with an element in said dummy row, and in inferential calculation with an event in said intermediate layer having been determined, a dummy element in said dummy row is used in place of the element of the event item in said intermediate layer, said dummy element being in the same column as the last-mentioned element.

14. The expert system of claim 13, further comprising a means for recording both times of occurrence of plural events in a common column of the assumed inference tree diagram and events when said plural events have occurred successively before occurrence of events in an adjacent column.

15. The expert system of claim 13, further comprising a means for notifying an operator of occurrence of plural events in a common column of said inference tree diagram as an abnormal state when said plural events have occurred successively before occurrence of events in an adjacent column.

* * * * *